C. TAYLOR.
Truck for Carrying Logs.
No. 89,703.
Patented May 4, 1869.
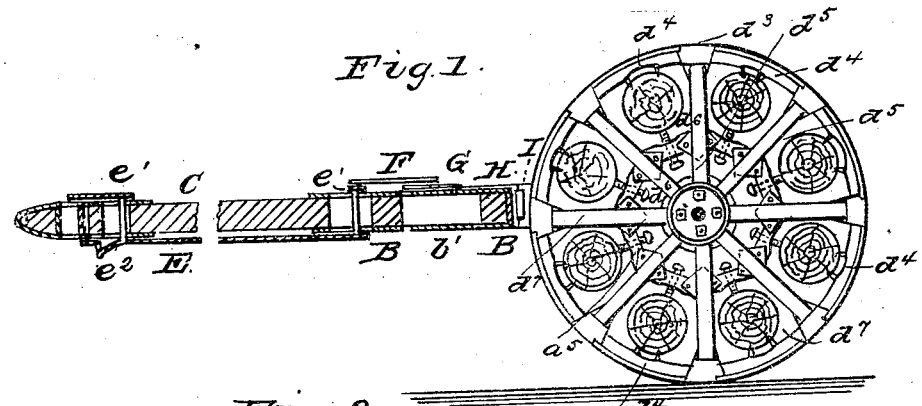
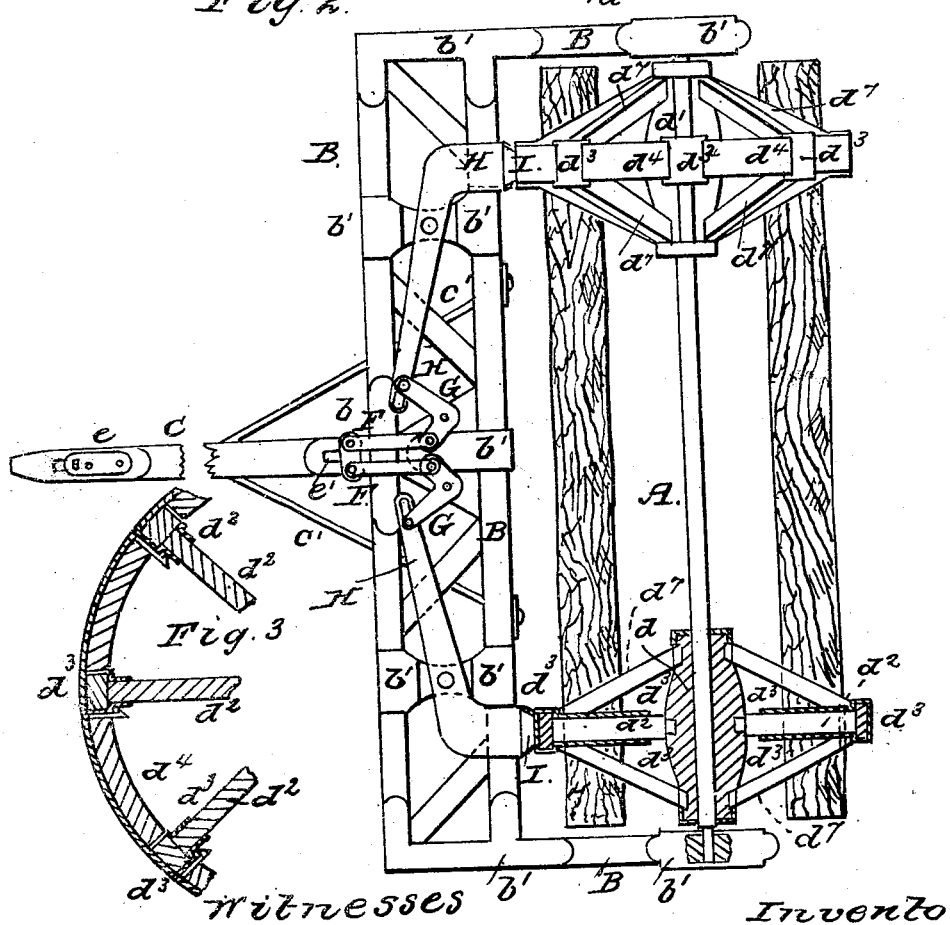

United States Patent Office.

CALVIN TAYLOR, OF HANDSBOROUGH, MISSISSIPPI.

Letters Patent No. 89,703, dated May 4, 1869.

IMPROVEMENT IN TRUCKS FOR CARRYING LOGS.

The Schedule referred to in these Letters Patent and making part of the same.

*To all whom it may concern:*

Be it known that I, CALVIN TAYLOR, of Handsborough, in the county of Harrison, and State of Mississippi, have invented a new and improved Log-Carrier; and I do hereby declare that the following is a full, clear, and exact description thereof, which will enable others skilled in the art to make and use the same, reference being had to the accompanying drawings, forming part of this specification, in which—

Figure 1 is a side view of my improved log-carrier, partly in section, through the tongue and frame, to show the construction.

Figure 2 is a top view of the same, partly in section, through one of the wheels.

Figure 3 is a detail sectional view of a part of one of the wheels.

Similar letters of reference indicate corresponding parts.

My invention has for its object to furnish an improved machine for carrying logs, which shall be so constructed and arranged that a much greater amount of timber may be carried with the same team than can be carried in any of the ordinary modes; and It consists in the construction of the various parts, as hereinafter more fully described.

A is the axle, which should be made of such a length that logs of the desired length may be received in the machine.

The ends of the axle A revolve in bearings in the side-bars of the frame B.

The axle A may be made in one piece, if desired, but I prefer to make it in parts, so that its length may be adjusted to the length of the logs to be carried, or so as to enable the machine, when unloaded, to be drawn along an ordinary roadway.

The frame B should also be so made, that parts of it may be conveniently removed, to adjust it to the length of the axle A.

The frame B is strengthened by plates, $b'$, attached to it at its joints and angles, as shown in the drawings.

C is the tongue, which is securely attached to the middle part of the frame B, and which is strengthened by the braces $c'$, as shown in fig. 2.

D are the wheels, which may be rigidly attached to the axle A, so as to carry the said axle with them in their revolution, or which may be loose upon said axle, and provided with clutches, so that they may be made to carry the said axle with them in their revolution, or may be allowed to revolve loosely upon the journals of the said axle, as may be desired.

The hubs, $d^1$, of the wheels D, are made long, and to their middle parts are securely attached the inner ends of the radial spokes $d^2$, eight, more or less, of which are used, according to the desired number of logs to be carried at a load.

The outer ends of the spokes $d^2$ are formed with an enlargement, or cross-head, which is strengthened by plates, $d^3$, passing over the ends, and down upon the sides of said spokes, to which they are securely attached.

If desired, the plates $d^3$ may be extended to the hubs $d^1$, and securely attached to said hubs, so as to strengthen the connection between the inner end of the said spokes and the said hubs.

The parts of the plates $d^3$ that cover the cross-head, or outer end of the spokes $d^2$, extend out upon one side, and the ends of said cross-heads, as shown in figs. 1 and 3, to form a socket and support for the ends of the segments of the rim of the wheels.

The rims of the wheels D are made in segments, $d^4$, one end of said segments entering the sockets formed by the plates $d^3$, at one side of the cross-heads of the spokes $d^2$, and their other ends shutting down into and resting in the recess formed by the said plates $d^3$, at the other side of said spokes, where they are secured in place by spring-catches, buttons, or other suitable device.

The segments $d^4$ are provided with segments of tire, securely attached to them in such a way as to form, in connection with the parts of the plates $d^3$, that pass over the faces of the cross-heads of the spokes $d^2$, may form a continuous tire for the said wheels.

The inner or concave sides of the segments or felloes $d^4$ are provided with spikes, which sink into the logs, and keep them securely in place.

$d^5$ are cross-bars, placed between each pair of radial spokes $d^2$, and securely bolted to the spokes $d^2$ and to the plates $d^3$.

The bars $d^5$ are provided with screws, $d^6$, passing through the said bars, or through long nuts let into and secured to said bars. The forward ends of the screws $d^6$ are pointed, or have heads provided with spikes swivelled to them, so that by forcing the said screws forward, the logs may be still further secured in place.

$d^7$ are inclined braces, the lower ends of which are secured to the long hubs $d^1$, near their ends, and the upper ends of which are secured to the outer parts of the radial spokes $d^2$, by bolts passing through the said spokes $d^2$, through the plates $d^3$, and through the ends of the inclined braces or spokes $d^7$.

By this construction of the wheels D, the log-carrier can be easily and conveniently loaded and unloaded, by simply removing the segments of the rims of said wheels.

E is the bar, placed beneath the tongue C, and secured in place by staples, in such a way that it may slide longitudinally.

The forward and rear ends of the bar E are still further supported by plates, $e^1$, placed above the tongue, and connected with said bar $e$ by bolts passing through slots in said tongue, as shown in figs. 1 and 2.

Upon the forward end of the bar E is formed a downwardly-projecting shoulder, $e^2$, to receive the neck-yoke ring, or other device for holding back the load, so that the force exerted in holding back may be applied to the bar E.

With the rear end of the bar or rod E are connected the forward ends of the connecting-bars or rods F, the rear ends of which are pivoted to the short arms of the elbow-levers G, which are pivoted, at their angles, to the frame C, and the ends of the long arms of which are pivoted to the long arms of the brake-levers H, by bolts passing through the ends of the said levers G, and through slots in the said levers H, as shown in fig. 2.

The brake-levers H are pivoted to the frame B, and to the ends of their short arms are attached the brake-shoes I, the levers H being made in such a shape as to bring the said shoes I squarely against the faces of the wheels D.

This construction and arrangement enable the brake to be applied by the action of the team in holding back the load, and with a force directly proportioned to the forward pressure of said load.

It should be observed that the brake E F G H I may be used with equal facility and advantage upon wagons and other vehicles, the levers being pivoted to the running-gearing or body of the vehicle, or to bars attached to the one or the other of said parts.

Having thus described my invention,
I claim as new, and desire to secure by Letters Patent—

1. The wheels D, constructed with segmental rims, and in substantially the manner herein shown and described, and for the purpose set forth.

2. The brake E F G H I, constructed and operating substantially as herein shown and described, and for the purpose set forth.

3. An improved log-carrier, formed by the combination of the wheels D, axle A, whether made in one or more parts, frame B, tongue C, and brake E F G H I, said parts being constructed and operating substantially as herein shown and described, and for the purpose set forth.

CALVIN TAYLOR.

Witnesses:
SAMUEL TAYLOR,
S. S. HENRY.